United States Patent
Alipour et al.

(10) Patent No.: US 10,728,931 B2
(45) Date of Patent: *Jul. 28, 2020

(54) SYSTEM, APPARATUS, AND METHOD FOR RECEIVED SIGNAL STRENGTH INDICATOR (RSSI) BASED AUTHENTICATION

(71) Applicant: NIKE, Inc., Beaverton, OR (US)

(72) Inventors: Hamid Alipour, Portland, OR (US); Robert P. Marreel, Tigard, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/048,657

(22) Filed: Jul. 30, 2018

(65) Prior Publication Data
US 2018/0368193 A1    Dec. 20, 2018

Related U.S. Application Data

(63) Continuation of application No. 15/354,738, filed on Nov. 17, 2016, now Pat. No. 10,039,145.

(Continued)

(51) Int. Cl.
*H04W 76/10* (2018.01)
*H04B 17/318* (2015.01)
(Continued)

(52) U.S. Cl.
CPC ............ *H04W 76/10* (2018.02); *H04B 1/385* (2013.01); *H04B 17/318* (2015.01); *H04L 43/16* (2013.01);
(Continued)

(58) Field of Classification Search
CPC ..... H04W 76/02; H04W 76/10; H04W 12/06; H04W 12/04; H04W 4/80; H04W 64/00;
(Continued)

(56) References Cited

U.S. PATENT DOCUMENTS 6,754,500 B1 *  6/2004  He ..................... H04W 72/085
                                                       370/431
6,842,621 B2 *  1/2005  Labun .................... H04L 29/06
                                                       455/456.3

(Continued)

*Primary Examiner* — Hai V Nguyen
(74) *Attorney, Agent, or Firm* — Shook, Hardy & Bacon L.L.P.

(57) ABSTRACT

Described herein are systems, apparatuses, and methods for performing proximity-based authentication operations using received signal strength indicator (RSSI) values. An expected proximity of devices to be paired is used to determine whether to execute a wireless personal area network (WPAN) connection process. This expected proximity is correlated with the RSSI value of received signals. By utilizing the RSSI value of received signals, embodiments do not utilize any additional hardware for performing the described proximity-based authentication process, and in some implementations, do not utilize any additional processes or routines to determine an RSSI value (e.g., some devices utilize RSSI values in order to adjust output power levels of transmitted signals, and thus, already execute processes or routines to determine RSSI values).

23 Claims, 7 Drawing Sheets

Related U.S. Application Data

(60) Provisional application No. 62/257,332, filed on Nov. 19, 2015.

(51) Int. Cl.

| | |
|---|---|
| *H04L 12/26* | (2006.01) |
| *H04B 1/3827* | (2015.01) |
| *H04W 12/06* | (2009.01) |
| *H04W 12/04* | (2009.01) |
| *H04L 29/06* | (2006.01) |
| *H04W 4/80* | (2018.01) |
| *H04W 12/00* | (2009.01) |
| *H04W 84/12* | (2009.01) |
| *H04M 1/725* | (2006.01) |
| *H04W 64/00* | (2009.01) |

(52) U.S. Cl.
CPC ........... *H04L 63/0861* (2013.01); *H04W 4/80* (2018.02); *H04W 12/003* (2019.01); *H04W 12/04* (2013.01); *H04W 12/06* (2013.01); *H04M 1/7253* (2013.01); *H04M 2203/2094* (2013.01); *H04M 2250/02* (2013.01); *H04M 2250/06* (2013.01); *H04M 2250/12* (2013.01); *H04W 12/00503* (2019.01); *H04W 12/00504* (2019.01); *H04W 64/00* (2013.01); *H04W 84/12* (2013.01)

(58) Field of Classification Search
CPC ..... H04W 84/12; H04B 17/318; H04B 1/385; H04B 1/3827; H04L 12/16; H04L 29/06; H04L 63/0861; H04L 43/16; H04M 1/7253; H04M 2203/2094; H04M 2250/02; H04M 2250/06; H04M 2250/12
USPC ............................................ 455/41.2, 41.1
See application file for complete search history.

(56) References Cited

U.S. PATENT DOCUMENTS

| | | | | |
|---|---|---|---|---|
| 7,346,369 B2 * | 3/2008 | Fitton | ................... | H04W 88/06 455/553.1 |
| 7,403,744 B2 * | 7/2008 | Bridgelall | ............. | H04W 4/203 340/10.1 |
| 7,573,820 B2 * | 8/2009 | Krishnaswamy | ........................... | H04W 72/1242 370/230 |
| 7,747,223 B2 * | 6/2010 | Wilson | ................ | H04M 1/7253 455/67.11 |
| 7,969,937 B2 * | 6/2011 | Iyer | ..................... | H04L 63/1441 370/328 |
| 8,179,859 B2 * | 5/2012 | Wang | ................ | H04W 36/0011 370/331 |
| 8,200,155 B2 * | 6/2012 | Lee | ....................... | H04W 48/18 455/41.2 |
| 8,260,319 B2 * | 9/2012 | Wenger | ................. | G01S 5/0289 340/539.1 |
| 8,315,228 B2 * | 11/2012 | George | ................. | H04W 36/14 370/331 |
| 8,364,088 B2 * | 1/2013 | Pattenden | ........... | H04M 1/7253 455/67.11 |
| 8,467,770 B1 * | 6/2013 | Ben Ayed | ............. | H04L 63/107 455/411 |
| 8,504,100 B2 * | 8/2013 | Songer | ................... | H04B 1/005 455/552.1 |
| 8,595,365 B2 * | 11/2013 | Scott | ....................... | H04L 67/16 709/227 |
| 8,615,197 B2 * | 12/2013 | Lee | ....................... | H04W 48/18 455/41.2 |
| 8,620,301 B1 * | 12/2013 | Hessel | ................... | H04W 16/18 455/423 |
| 8,675,618 B2 * | 3/2014 | Lee | ....................... | H04W 76/18 370/338 |
| 8,676,130 B2 * | 3/2014 | Wilson | ................ | H04M 1/7253 455/67.11 |
| 8,724,603 B2 * | 5/2014 | Barbu | .................... | H04W 48/18 370/338 |
| 8,744,391 B2 * | 6/2014 | Tenbrook | .............. | H04W 48/16 455/226.2 |
| 8,843,241 B2 * | 9/2014 | Saberi | ..................... | H04Q 9/00 700/287 |
| 8,856,045 B1 * | 10/2014 | Patel | ..................... | G06Q 30/06 705/71 |
| 8,874,764 B2 * | 10/2014 | Scott | ........................ | H04L 67/36 709/228 |
| 8,880,051 B2 * | 11/2014 | Ghosh | .................... | H04W 4/023 455/418 |
| 8,942,632 B2 * | 1/2015 | Shen | ....................... | H04W 88/04 455/41.2 |
| 9,161,293 B2 * | 10/2015 | Choudhary | ........... | H04W 48/14 |
| 9,219,987 B2 * | 12/2015 | Ghosh | ................... | H04W 4/023 |
| 9,230,104 B2 * | 1/2016 | Vasseur | ................ | H04L 63/1408 |
| 9,253,021 B2 * | 2/2016 | Vasseur | ................ | H04L 41/044 |
| 9,256,873 B2 * | 2/2016 | Patel | ..................... | G06Q 20/401 |
| 9,282,433 B2 * | 3/2016 | Gupta | ..................... | H04W 4/90 |
| 9,295,099 B2 * | 3/2016 | Twitchell, Jr. | .... | H04W 52/0235 |
| 9,307,429 B2 * | 4/2016 | Cavallaro | ............. | H04W 24/08 |
| 9,319,953 B2 * | 4/2016 | Chen | ..................... | H04W 36/14 |
| 9,332,578 B2 * | 5/2016 | Debates | .............. | G06K 9/00664 |
| 9,357,348 B2 * | 5/2016 | Evans | .................... | H04W 4/029 |
| 9,374,672 B1 * | 6/2016 | Chao | ...................... | H04W 4/33 |
| 9,398,422 B2 * | 7/2016 | Zampini, II | ....... | H04W 52/0296 |
| 9,408,036 B2 * | 8/2016 | Hart | ....................... | H04W 4/029 |
| 9,413,779 B2 * | 8/2016 | Vasseur | ................ | H04L 43/0876 |
| 9,435,765 B2 * | 9/2016 | Reimitz | ........... | G01N 27/44782 |
| 9,438,499 B2 * | 9/2016 | Cole | ...................... | H04L 43/10 |
| 9,445,224 B2 * | 9/2016 | Cavallaro | ............. | H04W 24/08 |
| 9,503,466 B2 * | 11/2016 | Vasseur | ................ | H04L 43/0876 |
| 9,503,864 B1 * | 11/2016 | Chao | ...................... | H04W 4/00 |
| 9,544,923 B2 * | 1/2017 | Gupta | ..................... | H04W 4/90 |
| 9,547,859 B2 * | 1/2017 | Patel | ...................... | G07F 9/023 |
| 9,565,085 B2 * | 2/2017 | Balachandran | ..... | H04L 43/0811 |
| 9,594,354 B1 * | 3/2017 | Kahn | ..................... | G04G 21/00 |
| 9,615,210 B2 * | 4/2017 | Evans | .................... | H04W 4/21 |
| 9,628,937 B2 * | 4/2017 | Chao | ..................... | H04W 12/00 |
| 9,629,004 B2 * | 4/2017 | Hassan | ................ | H04W 24/02 |
| 9,638,537 B2 * | 5/2017 | Abramson | ......... | G01C 21/3626 |
| 9,641,963 B2 * | 5/2017 | Park | ..................... | H04W 4/80 |
| 9,654,934 B2 * | 5/2017 | Chao | .................... | H04W 12/08 |
| 9,693,178 B2 * | 6/2017 | Adrangi | ................ | H04W 4/70 |
| 9,693,390 B2 * | 6/2017 | Beninghaus | ......... | H04B 17/309 |
| 9,706,448 B2 * | 7/2017 | Naik | ................. | H04W 36/0022 |
| 9,710,214 B2 * | 7/2017 | Lin | ....................... | H04W 76/14 |
| 9,730,257 B2 * | 8/2017 | Kwon | ................... | H04W 76/14 |
| 9,947,004 B2 * | 4/2018 | Shankar | ............... | G06Q 20/3224 |
| 10,039,145 B2 * | 7/2018 | Alipour | ................ | H04B 17/318 |
| 10,159,044 B2 * | 12/2018 | Hrabak | ................ | H04W 52/0245 |
| 10,219,139 B2 * | 2/2019 | Palin | .................... | H04W 8/005 |
| 2003/0119527 A1 * | 6/2003 | Labun | ................... | H04W 28/06 455/456.1 |
| 2006/0030270 A1 * | 2/2006 | Cheng | ................ | H04B 17/0085 455/67.11 |
| 2006/0121916 A1 * | 6/2006 | Aborn | ................ | H04M 3/42246 455/456.5 |
| 2006/0183473 A1 * | 8/2006 | Ukon | ..................... | H04W 16/10 455/426.1 |
| 2007/0060105 A1 * | 3/2007 | Batta | .................... | H04W 12/06 455/410 |
| 2007/0094210 A1 * | 4/2007 | Craig | ...................... | G06N 5/02 706/50 |
| 2007/0275683 A1 * | 11/2007 | Songer | ................ | H04B 1/005 455/185.1 |
| 2008/0181187 A1 * | 7/2008 | Scott | ..................... | H04W 48/18 370/338 |
| 2008/0242220 A1 * | 10/2008 | Wilson | ................ | H04M 1/7253 455/3.04 |
| 2008/0299927 A1 * | 12/2008 | Tenbrook | ............. | H04W 48/16 455/226.2 |

(56) References Cited

U.S. PATENT DOCUMENTS

| | | | |
|---|---|---|---|
| 2009/0081952 A1* | 3/2009 | Lee | H04W 48/18 455/41.2 |
| 2009/0086657 A1* | 4/2009 | Alpert | H04L 1/1838 370/310 |
| 2009/0104906 A1* | 4/2009 | Lee | H04W 76/18 455/435.1 |
| 2009/0163204 A1* | 6/2009 | Farnsworth | H04W 48/16 455/434 |
| 2009/0213811 A1* | 8/2009 | Wang | H04W 36/0011 370/331 |
| 2010/0234071 A1* | 9/2010 | Shabtay | H04B 7/0408 455/562.1 |
| 2011/0066297 A1* | 3/2011 | Saberi | F16K 37/0091 700/287 |
| 2011/0110282 A1* | 5/2011 | Wu | H04W 52/0235 370/311 |
| 2011/0153805 A1* | 6/2011 | Beninghaus | H04B 17/309 709/224 |
| 2011/0182273 A1* | 7/2011 | George | H04W 36/14 370/338 |
| 2011/0235624 A1* | 9/2011 | Scott | H04L 67/16 370/338 |
| 2011/0238824 A1* | 9/2011 | Scott | H04L 67/30 709/224 |
| 2011/0238847 A1* | 9/2011 | Scott | H04L 67/16 709/228 |
| 2012/0075440 A1* | 3/2012 | Ahuja | G06T 7/11 348/61 |
| 2012/0230304 A1* | 9/2012 | Barbu | H04W 48/18 370/338 |
| 2012/0230305 A1* | 9/2012 | Barbu | H04W 48/20 370/338 |
| 2012/0244808 A1* | 9/2012 | Lee | H04W 48/18 455/41.2 |
| 2012/0258741 A1* | 10/2012 | Tillson | G01S 3/046 455/457 |
| 2013/0040693 A1* | 2/2013 | Chen | H04W 36/14 455/525 |
| 2013/0077505 A1* | 3/2013 | Choudhary | H04W 48/14 370/252 |
| 2013/0118900 A1* | 5/2013 | Reimitz | G01N 27/44782 204/450 |
| 2013/0137375 A1* | 5/2013 | Wilson | H04M 1/7253 455/41.2 |
| 2013/0227114 A1* | 8/2013 | Vasseur | H04L 41/044 709/224 |
| 2013/0281021 A1* | 10/2013 | Palin | H04W 8/005 455/41.2 |
| 2013/0283351 A1* | 10/2013 | Palin | G06F 21/6218 726/4 |
| 2013/0298208 A1* | 11/2013 | Ayed | G06F 21/00 726/6 |
| 2014/0006191 A1* | 1/2014 | Shankar | G06Q 20/3224 705/18 |
| 2014/0051449 A1* | 2/2014 | Yerrabommanahalli | H04W 36/30 455/437 |
| 2014/0065967 A1* | 3/2014 | Shen | H04W 80/00 455/41.2 |
| 2014/0068059 A1* | 3/2014 | Cole | H04L 43/10 709/224 |
| 2014/0068092 A1* | 3/2014 | Cole | H04W 76/10 709/228 |
| 2014/0079022 A1* | 3/2014 | Wang | H04W 36/0069 370/331 |
| 2014/0086173 A1* | 3/2014 | Sadeghi | H04L 5/005 370/329 |
| 2014/0141714 A1* | 5/2014 | Ghosh | H04W 4/023 455/39 |
| 2014/0149873 A1* | 5/2014 | Wilson | H04M 1/7253 715/736 |
| 2014/0162589 A1* | 6/2014 | Gupta | H04W 4/90 455/404.2 |
| 2014/0213301 A1* | 7/2014 | Evans | H04W 4/023 455/456.3 |
| 2014/0280901 A1* | 9/2014 | Balachandran | H04W 24/04 709/224 |
| 2014/0307574 A1* | 10/2014 | Choi | H04W 24/02 370/252 |
| 2014/0357194 A1* | 12/2014 | Jin | H04W 8/005 455/41.2 |
| 2014/0370917 A1* | 12/2014 | Buchheim | H04W 4/026 455/456.1 |
| 2015/0036514 A1* | 2/2015 | Zhu | H04W 52/244 370/252 |
| 2015/0128205 A1* | 5/2015 | Mahaffey | H04L 63/20 726/1 |
| 2015/0163748 A1* | 6/2015 | Hrabak | H04W 52/0245 455/41.2 |
| 2015/0172866 A1* | 6/2015 | Ghosh | H04W 4/023 455/456.3 |
| 2015/0188949 A1* | 7/2015 | Mahaffey | H04L 63/20 726/1 |
| 2015/0193693 A1* | 7/2015 | Vasseur | H04L 43/0876 706/12 |
| 2015/0193697 A1* | 7/2015 | Vasseur | H04L 43/0876 706/12 |
| 2015/0208276 A1* | 7/2015 | De Pasquale | H04L 47/11 370/229 |
| 2015/0208277 A1* | 7/2015 | De Pasquale | H04L 47/11 370/230.1 |
| 2015/0227928 A1* | 8/2015 | Patel | G06Q 20/32 705/71 |
| 2015/0245265 A1* | 8/2015 | Chen | H04W 36/14 455/437 |
| 2015/0281985 A1* | 10/2015 | Cavallaro | H04W 24/08 455/41.2 |
| 2015/0282088 A1* | 10/2015 | Weizman | H04W 52/0245 455/41.2 |
| 2015/0289066 A1* | 10/2015 | Pedersen | H04R 25/554 381/315 |
| 2015/0324582 A1* | 11/2015 | Vasseur | G06F 21/554 726/23 |
| 2015/0332248 A1* | 11/2015 | Weksler | H04W 12/02 705/71 |
| 2015/0334245 A1* | 11/2015 | Lin | H04W 76/14 370/261 |
| 2015/0334676 A1* | 11/2015 | Hart | H04W 4/029 455/456.1 |
| 2016/0021116 A1* | 1/2016 | Maguire | H04L 63/102 726/4 |
| 2016/0021152 A1* | 1/2016 | Maguire | G06F 16/5866 709/204 |
| 2016/0037563 A1* | 2/2016 | Debates | G06K 9/4642 455/41.2 |
| 2016/0044504 A1* | 2/2016 | Edge | H04W 12/02 455/456.3 |
| 2016/0098711 A1* | 4/2016 | Patel | G06Q 20/3823 705/44 |
| 2016/0127875 A1* | 5/2016 | Zampini, II | H04W 52/0296 370/311 |
| 2016/0135205 A1* | 5/2016 | Barbu | H04W 48/20 370/338 |
| 2016/0143065 A1* | 5/2016 | Gupta | H04W 4/90 455/404.2 |
| 2016/0156682 A1* | 6/2016 | Jeon | H04L 65/1069 709/204 |
| 2016/0174023 A1* | 6/2016 | Cavallaro | H04W 24/08 455/41.2 |
| 2016/0192173 A1* | 6/2016 | Ghosh | H04W 4/023 370/252 |
| 2016/0216130 A1* | 7/2016 | Abramson | G01C 21/3626 |
| 2016/0246753 A1* | 8/2016 | Tan | G06F 13/4282 |
| 2016/0249168 A1* | 8/2016 | Evans | G06F 21/88 |
| 2016/0249394 A1* | 8/2016 | Debates | H04N 7/181 |
| 2016/0262082 A1* | 9/2016 | Flynn | H04W 48/18 |
| 2016/0262205 A1* | 9/2016 | Flynn | H04W 52/0212 |

(56) References Cited

U.S. PATENT DOCUMENTS

| | | | |
|---|---|---|---|
| 2016/0278147 A1* | 9/2016 | Adrangi | H04W 4/70 |
| 2016/0278151 A1* | 9/2016 | Kwon | H04W 76/14 |
| 2016/0306955 A1* | 10/2016 | Martin | G06F 21/34 |
| 2016/0323934 A9* | 11/2016 | Beninghaus | H04B 17/309 |
| 2016/0352391 A1* | 12/2016 | Lin | H04B 5/0056 |
| 2016/0353330 A1* | 12/2016 | Naik | H04W 36/0022 |
| 2016/0360341 A1* | 12/2016 | Srivatsa | H04M 1/7253 |
| 2016/0373894 A1* | 12/2016 | Evans | H04W 4/21 |
| 2016/0374104 A1* | 12/2016 | Watfa | H04W 72/10 |
| 2017/0013417 A1* | 1/2017 | Zampini, II | H04W 52/0296 |
| 2017/0041271 A1* | 2/2017 | Tal | G06Q 50/01 |
| 2017/0041388 A1* | 2/2017 | Tal | H04W 12/08 |
| 2017/0048679 A1* | 2/2017 | Chao | H04W 4/00 |
| 2017/0048773 A1* | 2/2017 | Miao | H04W 36/14 |
| 2017/0070891 A1* | 3/2017 | Chao | H04L 63/14 |
| 2017/0094597 A1* | 3/2017 | Su | H04W 12/0017 |
| 2017/0150533 A1* | 5/2017 | Alipour | H04W 76/10 |
| 2017/0154326 A1* | 6/2017 | Jo | G06Q 20/3278 |
| 2017/0193508 A1* | 7/2017 | Patel | G06Q 20/3823 |
| 2017/0201931 A1* | 7/2017 | Swanzey | H04L 63/0876 |
| 2017/0203684 A1* | 7/2017 | Georgitsis | B60Q 11/005 |
| 2017/0238140 A9* | 8/2017 | Buchheim | H04W 4/026 455/456.1 |
| 2017/0372054 A1* | 12/2017 | Palin | G06F 21/6218 |
| 2018/0027386 A1* | 1/2018 | Zampini, II | H04W 52/0296 370/311 |
| 2018/0268396 A1* | 9/2018 | Shankar | G06Q 20/3224 |

* cited by examiner

SYSTEM, APPARATUS, AND METHOD FOR RECEIVED SIGNAL STRENGTH INDICATOR (RSSI) BASED AUTHENTICATION

CROSS-REFERENCE TO RELATED APPLICATIONS

This application is a Continuation of U.S. application Ser. No. 15/354,738, entitled "System, Apparatus, and Method for Received Signal Strength Indicator (RSSI) Based Authentication", and filed Nov. 17, 2016, which claims the benefit of priority of U.S. Provisional Patent Application No. 62/257,332, filed on Nov. 19, 2015. The entirety of the aforementioned is incorporated by reference herein.

TECHNICAL FIELD

The present application relates generally to the technical field of mobile computing devices and, in particular, to communicatively coupling mobile computing devices.

BACKGROUND

Computing devices can be used for a variety of applications, including user activity monitoring and biometric sensor data accumulation. For example, wearable mobile computing devices can be communicatively coupled to a primary, non-wearable device (e.g., a wearable smartwatch can be communicatively coupled to a smartphone). Currently, computing devices that fail to use authentication procedures are susceptible to erroneous or malicious connections to unknown devices. Furthermore, existing authentication procedures for coupling proximate computing devices still fail to account for malicious connection attempts from unknown peripheral devices.

BRIEF DESCRIPTION OF THE DRAWINGS

The following description includes discussions of figures having illustrations given by way of example of implementations and embodiments of the subject matter disclosed herein. The drawings should be understood by way of example, and not by way of limitation. As used herein, references to one or more "embodiments" are to be understood as describing an example feature, structure, or characteristic included in at least one implementation of the disclosure. Thus, phrases such as "in one embodiment" or "in an alternate embodiment" appearing herein describe various example embodiments and implementations of the disclosure, and do not necessarily all refer to the same embodiment. However, such phrases are also not necessarily mutually exclusive.

Descriptions of certain details and implementations follow, including a description of the figures, which can depict some or all of the embodiments described below, as well as a description of other potential embodiments or implementations of the concepts presented herein. An overview of embodiments is provided below, followed by a more detailed description with reference to the drawings.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the disclosure can be practiced without these specific details. In general, well-known instruction instances, protocols, structures, and techniques have not been shown in detail.

Throughout this specification, several terms of art are used. These terms are to take on their ordinary meaning in the art from which they come, unless specifically defined herein or unless the context of their use would clearly suggest otherwise. In the following description, numerous specific details are set forth to provide a thorough understanding of the example embodiments. One skilled in the relevant art will recognize, however, that the techniques described herein can be practiced without one or more of the specific details, or with other methods, components, materials, and so forth. In other instances, well-known structures, materials, or operations are not shown or described in detail to avoid obscuring certain aspects of the disclosure.

Figure 1:
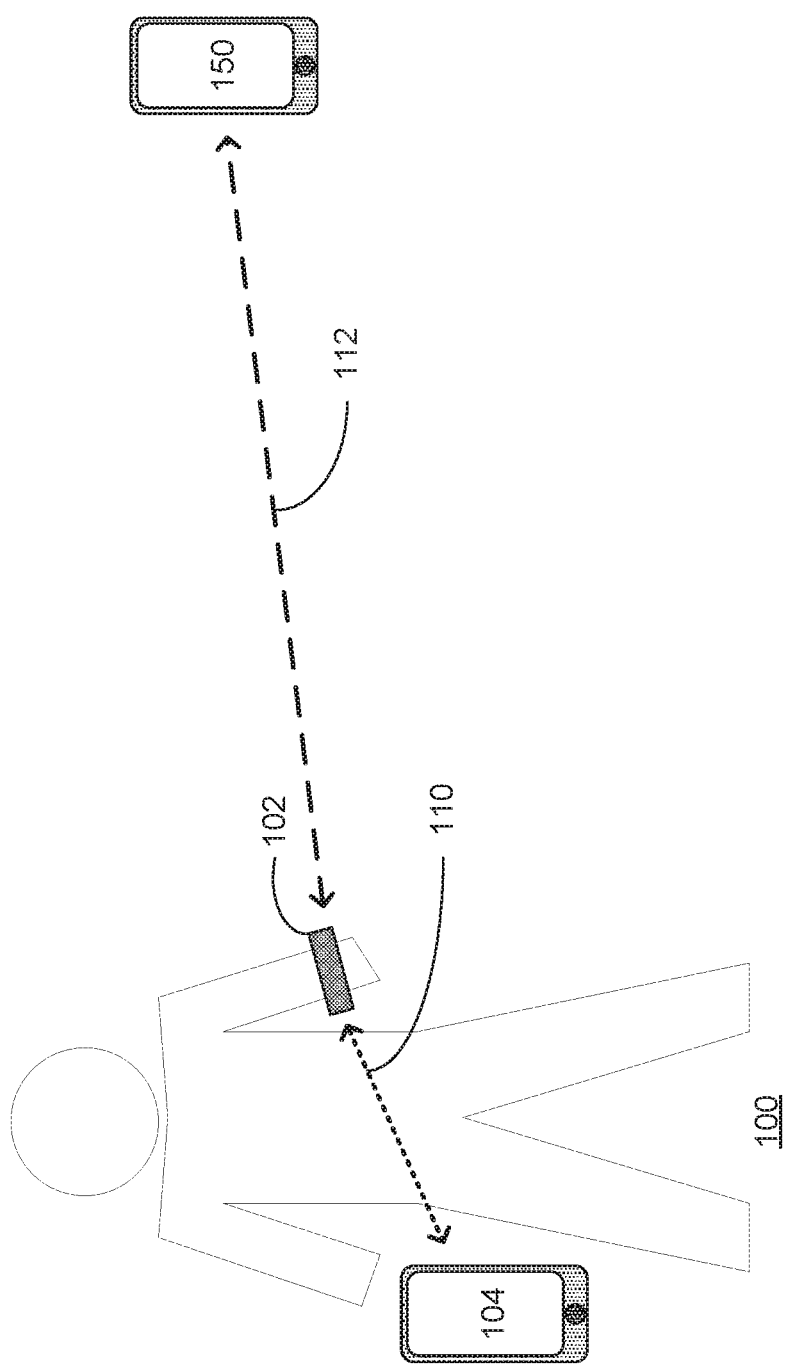
FIG. 1 is an illustration of a user utilizing a plurality of mobile computing devices in accordance with some embodiments.

FIG. 1 is an illustration of a user utilizing a plurality of mobile computing devices, in accordance with some embodiments. A user 100 is illustrated as wearing a wearable mobile computing device 102 that is to be communicatively coupled to a mobile computing device 104, illustrated in this example as a smartphone. By way of example, the wearable mobile computing device 102 is shown to include a wearable housing configured for wearing on a wrist of the user 100 (e.g., the mobile computing device 102 may be a smartwatch). It should be noted that other embodiments can comprise a wearable housing configured for wearing elsewhere. Furthermore, in other embodiments, the features below may be applied to any combination of non-wearable mobile computing devices, low-mobility computing devices, and so forth.

The wearable mobile computing device 102 can be used to monitor movements/activities of the user 100. For example, the housing for the wearable mobile computing device 102 can include biometric sensors for collecting biometric data from the user 100, in addition to other hardware of the wearable mobile computing device 102 (e.g., processing circuitry, memory, antennas, etc.). The housing can at least partially enclose these biometric sensors. The biometric sensors can comprise any sensor capable of detecting biometric data such as pulse/heart rate, blood pressure, body temperature, etc. The wearable mobile computing device 102 can include additional sensor assemblies to generate motion sensor data (e.g., via an accelerometer, gyroscope, etc.) Any combination of sensor data from these sensors can be tracked to determine the activity level of the user 100, and/or can be used to identify an activity of the user 100. For example, software logic and/or modules can be executed via one or more processing units included in the wearable mobile computing device 102 and/or the mobile computing device 104 (described by way of example in further detail below) to compare a sensor signal to one or more signal or activity "templates" or "signatures." Detected movements or parameters determined from the collected sensor data can include (or be used to form) a variety of different parameters, metrics or physiological characteristics including, but not limited to, speed, distance, steps taken, and energy expenditure such as calories, heart rate, sweat detection, effort, oxygen consumed, oxygen kinetics, etc.

The user 100 is illustrated by way of example as utilizing a mobile computing device 104. The mobile computing device 104 can be a smartphone, a personal digital assistant (PDA), a tablet, etc. The mobile computing device 104 can be configured to receive data from the wearable mobile computing device 102, and execute one or more applications utilizing the received data. For example, the mobile computing device 104 can execute applications (e.g., a mobile app) to perform operations based on receiving real-time data from the wearable mobile computing device 102, such as applications for displaying and recoding biometric data of the user 100.

The wearable mobile computing device 102 and the mobile computing device 104 can be communicatively coupled via a variety of device pairing processes. For example, the wearable mobile computing device 102 and the mobile computing device 104 can utilize a short range wireless interface (e.g., a wireless personal area network (WPAN)), such as near field communication (NFC), Bluetooth® (e.g., Bluetooth® Low Energy (BLE)), Wi-Fi®, etc. Some wireless interfaces are designed to operate within a limited distance range. For example, BLE devices consume a fraction of the power of conventional Bluetooth enabled devices, but are expected to be within a shorter range (e.g., less than ten meters).

The wearable mobile computing device 102 and the mobile computing device 104 are shown to be placed apart by a distance 110. A third mobile computing device 150 is shown to be a further distance 112 from the wearable mobile computing device 102 than the mobile computing device 104, and thus, potentially too far to exchange pairing process signals with the wearable mobile computing device 102. However, the device 150 can amplify the signals it transmits/receives, thereby potentially performing a pairing process with the wearable mobile computing device 102, and subsequently receive data from the wearable mobile computing device 102 unintentionally or maliciously.

In some embodiments, an expected proximity of devices to be paired is used to determine whether to execute a WPAN connection process. As described by way of example in further detail below, received signal strength indicator (RSSI) values for signals received can be used by a device (or by both devices to be paired) in order to determine whether to execute or terminate a WPAN connection process. In this example, RSSI values for signals exchanged over the distance 110 are higher than the RSSI values for signals exchanged over the distance 112, and thus the wearable mobile computing device 102 can determine which device to connect to (in this example, the mobile computing device 104).

Previous solutions that utilize device locations in authentication procedures utilize specific geographic (e.g., Global Positioning System (GPS) processes) or triangulation data (e.g., WiFi or cellular triangulation processes) that involve high processing overhead and additional hardware. By utilizing the RSSI value of received signals, embodiments do not utilize any additional hardware, and in some embodiments, do not utilize any additional processes or routines to determine an RSSI value (e.g., some devices utilize RSSI values in order to adjust output power levels of transmitted signals, and thus, already execute processes or routines to determine RSSI values).

Figure 2A:
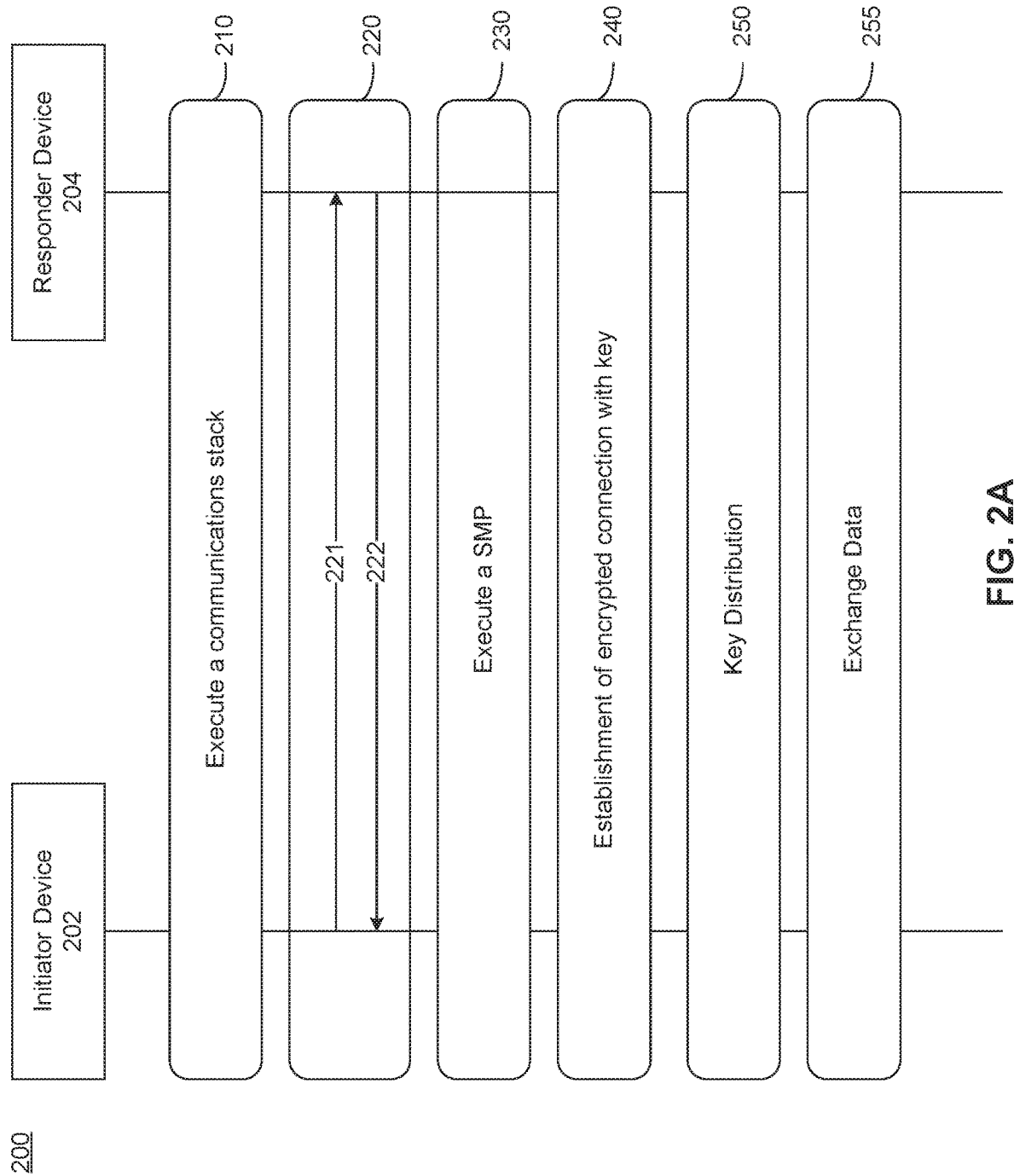
FIG. 2A illustrates a wireless personal area network method executed by an initiator device and a responder device, in accordance with some embodiments.

FIG. 2A illustrates a WPAN method executed by an initiator device and a responder device, in accordance with some embodiments.

The illustrated method can be executed by wireless connection controllers included in an initiator device 202 and a responder device 204. The initiator device 202 and/or the responder device 204 can be, for example, the wearable mobile computing device 102 or the mobile computing device 104 of FIG. 1. For example, the initiator device 202 and the responder device 204 may both comprise wearable mobile computing devices (e.g., computing devices housed in a pair of shoes communicatively coupled to one another) or a pair of non-wearable mobile computing devices (e.g., a smartphone communicatively coupled to a laptop computing device). In other embodiments, the initiator device 202 and/or the responder device 204 can comprise a low-mobility computing device such as a desktop computer, a computerized sensor device (used for example, in device-to-device (D2D) communication networks), and so forth.

As shown at operation 210, operations to execute a communications stack associated with the WPAN (e.g., a Bluetooth communications stack) are performed by the initiator device 202 and the responder device 204. The communications stack of these devices can be described in terms of a state machine with the following five states: a standby state, an advertising state, a scanning state, an initiating state, and a connection state.

In an example embodiment, the communications stack in the standby state does not transmit or receive any packets or signals. Further, the standby state can be entered from any other state. The communications stack in the advertising state can transmit advertising channel packets or signals, as well as monitor for responses triggered by these advertising channel packets or signals. A device in the advertising state can be referred to as an advertiser. The advertising state can be entered from the standby state.

The communications stack in the scanning state can listen for advertising channel packets or signals from devices that are advertising. A device in the scanning state can be referred to as a scanner. The scanning state can be entered from the standby state.

The communications stack in the initiating state can listen for advertising channel packets or signals from a specific device(s) and respond to these packets or signals to initiate a connection with another device. A device in the initiating state can be referred to as an initiator. The initiating state can be entered from the standby state. The connection state can be entered either from the initiating state or the advertising state. A device in the connection state can be referred to as being in a connection.

Within the connection state, devices can function in a master role or a slave role. When entered from the initiating state, the connection state can be in the slave role. When entered from the advertising state, the connection state can be in the Slave Role. The communications stack in the Slave Role can communicate with a device in the Slave Role and define the timings of transmissions. The communications stack in the Slave Role can communicate with a single device in the Slave Role.

Operations to execute a pairing process are performed by the initiator device 202 and the responder device 204 (see operation 220). In this example embodiment, the initiator device 202 sends a pairing request signal 221 to the responding device. The responder device 204 sends a pairing response signal 222 to the initiator device 202. These request/response signals can comprise messages that include device capabilities (e.g., input/output capabilities encryption characteristics, etc.

Operations to execute a security management protocol (SMP) are performed by the initiator device 202 and the responder device 204 (see operation 230). An SMP can be used for pairing and transport specific key distribution. Thus, subsequent to executing an SMP, the initiator device 202 and the responder device 204 can establish an encrypted connection (see operation 240) and perform key distribution operations (see operation 250) to distribute, for example, transport specific keys, such as a long term key (LTK) and encrypted diversifier (EDIV) values. The initiator and responder devices 202 & 204 can subsequently exchange data over the encrypted connection (see operation 255).

Figure 2B:
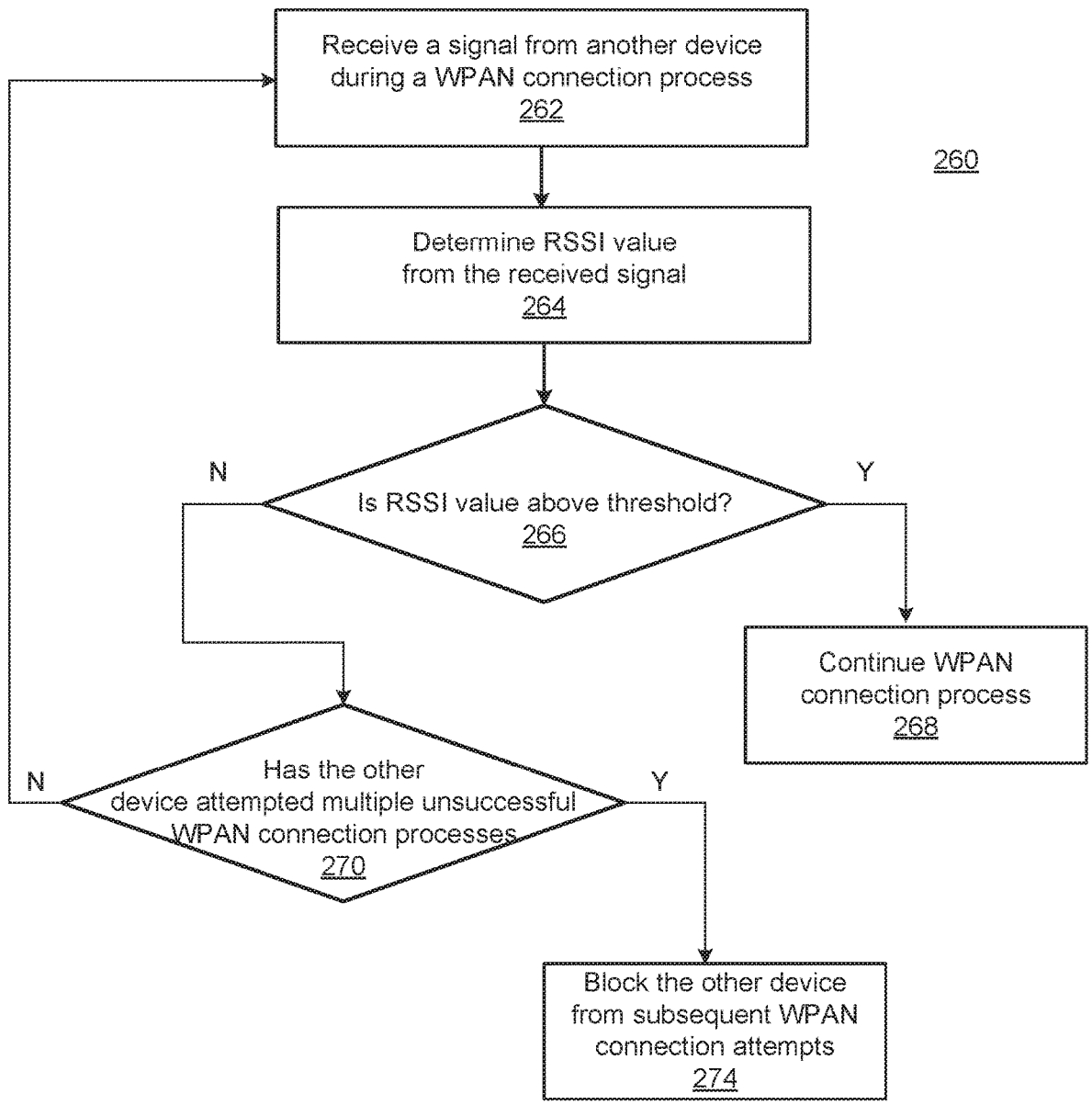
FIG. 2B illustrates a wireless personal area network method for utilizing received signal strength indicator values, in accordance with some embodiments.

FIG. 2B illustrates a WPAN connection method for utilizing RSSI values, in accordance with some embodiments. A method 260 can be executed by either the requestor device 204, the initiator device 202, or both devices.

An operation is executed by a device to receive a signal from another device during a WPAN connection process (see operation 262). This signal can be any signal described in the example method 200 of FIG. 2A for example, the pairing request/response signals 221/222. An RSSI value is determined from the received signal (shown as block 264), and a determination is made whether the RSSI value is above a threshold value (see operation 266). If the RSSI value is above the threshold value, the other device is presumed to be authorized to (initially attempt or subsequently complete) a pairing process due to its proximity, and the pairing process can continue (see operation 268).

If the RSSI value is below a threshold value, a determination is made as to whether the other device has attempted multiple unsuccessful WPAN connection processes (see operation 270). If the number of pairing attempts by the other device is below a predefined limit, then a connection may subsequently be attempted. For example, one of the devices can display instructions to move closer in proximity to the other device. If the number of pairing attempts by the other device is above a predefined limit (e.g., devices may have a limit of three consecutive pairing attempt failures), then identification data of the other device is logged to block any other subsequent attempt of the WPAN connection process by the other device (shown as block 274).

Figure 3:
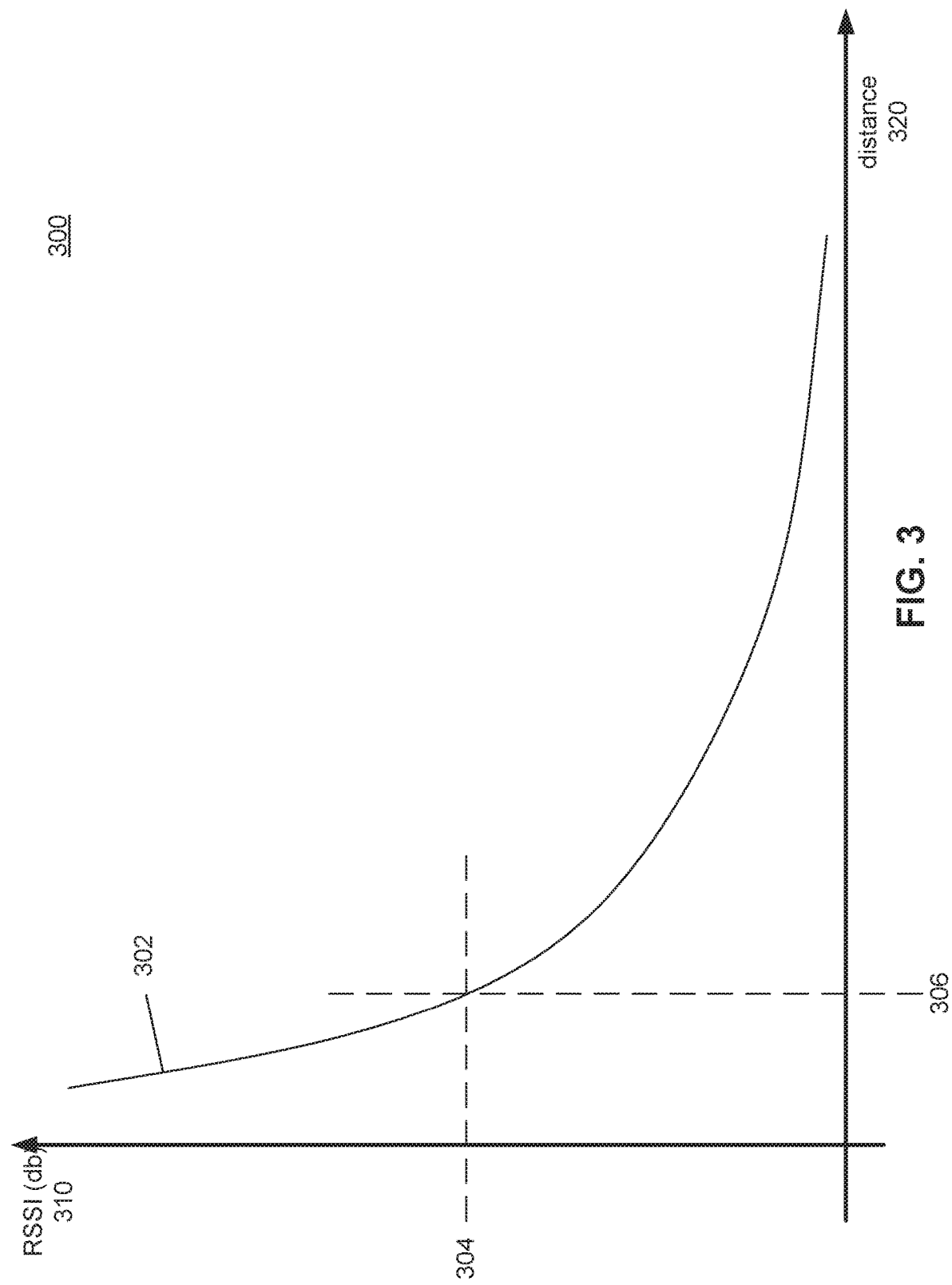
FIG. 3 is an illustration of a received signal strength indicator graph including signal and proximity threshold values, in accordance with some embodiments.

FIG. 3 is an illustration of an RSSI graph including signal and proximity threshold values, in accordance with some embodiments. A graph 300 is illustrated as including an RSSI curve for RSSI values (shown as y-axis 310) over distance values (e.g., distances between devices exchanging signals, shown as x-axis 320). Due to low power levels and the attenuation of free space, an RSSI value in some embodiments may be expressed as a negative number, wherein the closer the RSSI value is to zero, the stronger the signal is (and thus, the values of the y-axis 310 would ascend towards zero in these embodiments).

As illustrated in this example, the RSSI values decrease as the distance values increase. In this embodiment, a threshold RSSI value 304 is shown to correspond to an expected maximum distance 306 between devices to be paired. The threshold value can be selected based on an expected use of the devices to be paired and an expected power output for the devices. For example, for wearable computing devices to be coupled to a smartphone, the expected maximum distance 306 can be within a meter (e.g., corresponding to an RSSI value of −60 dB or higher). In another example, machine type communication (MTC) devices can be expected to be communicatively coupled to a mobile computing device 104 within larger distances (e.g., corresponding to an RSSI value less than −80 dB).

Thus, RSSI values are utilized to determine if devices are within an expected proximity. Additional processes can be executed to determine if the devices are authorized to be coupled via a WPAN. Furthermore, RSSI-based verification processes can be executed by only one device in a WPAN, or by multiple devices.

Figure 4:
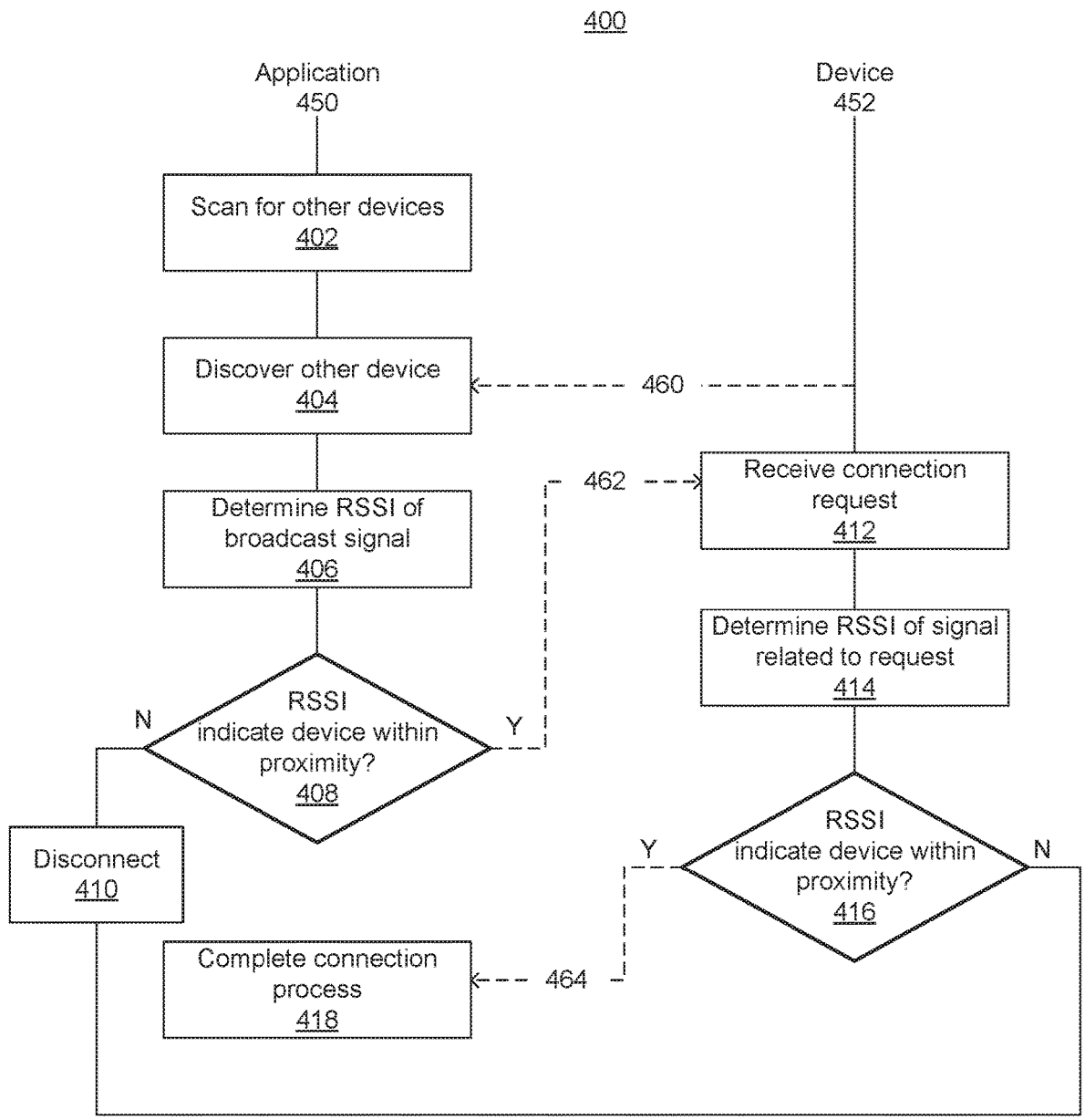
FIG. 4 is a flow diagram of a two way received signal strength indicator based verification method, in accordance with some embodiments.

FIG. 4 is a flow diagram of a two way RSSI based verification method, in accordance with some embodiments. A method 400 is illustrated as including operations executed by an application 450 of a first computing device 104 (e.g., a smartphone), and operations executed by a second computing device 452 (e.g., a wireless connection controller of a wearable or peripheral mobile computing device 102, 104).

The application 450 executes an operation to scan for other devices within its proximity (see operation 402). This proximity can be determined, for example, by a transmit power of the device executing the application 450, a predetermined value based on an expected separate distance between the device executing the application 450 and other devices, and so forth. The application 450 discovers the second computing device 452 via an advertising broadcast signal 460 (see operation 404). The second computing device 452 may thus be referred to as a "proximate" computing device. The application 450 executes an operation to determine the RSSI value of the advertising broadcast signal 460 (see operation 406) in order to further determine if the second mobile device 452 is within an expected proximity (see operation 408).

If it is determined the second computing device 452 is not within the expected proximity, based on the RSSI value of the advertising signal broadcast 460, the connection process is terminated (see operation 410). Otherwise, a connection request 462 is transmitted by the application 450 to the second computing device 452. The second computing device 452 receives a signal (or signals) related to the connection request 462 (see operation 412). The second computing device 452 executes an operation to determine the RSSI value of the received signal (see operation 414) to determine if the computing device executing the application 450 is within an expected proximity (see operation 416).

If it is determined the second computing device 452 is not within the expected proximity based on the RSSI of the advertising signal broadcast 460, the connection process is terminated (see operation 410). Otherwise, a connection response 464 is transmitted by the second computing device 452 and is processed by the application 450 to complete the connection process (see operation 418), including any authentication and key agreement (AKA) authentication process utilized by the respective WPAN. In some embodiments, the application 450 may subsequently execute a method similar to the method 400 for one or more other computing devices to be simultaneously communicatively coupled to said devices.

Figure 5:
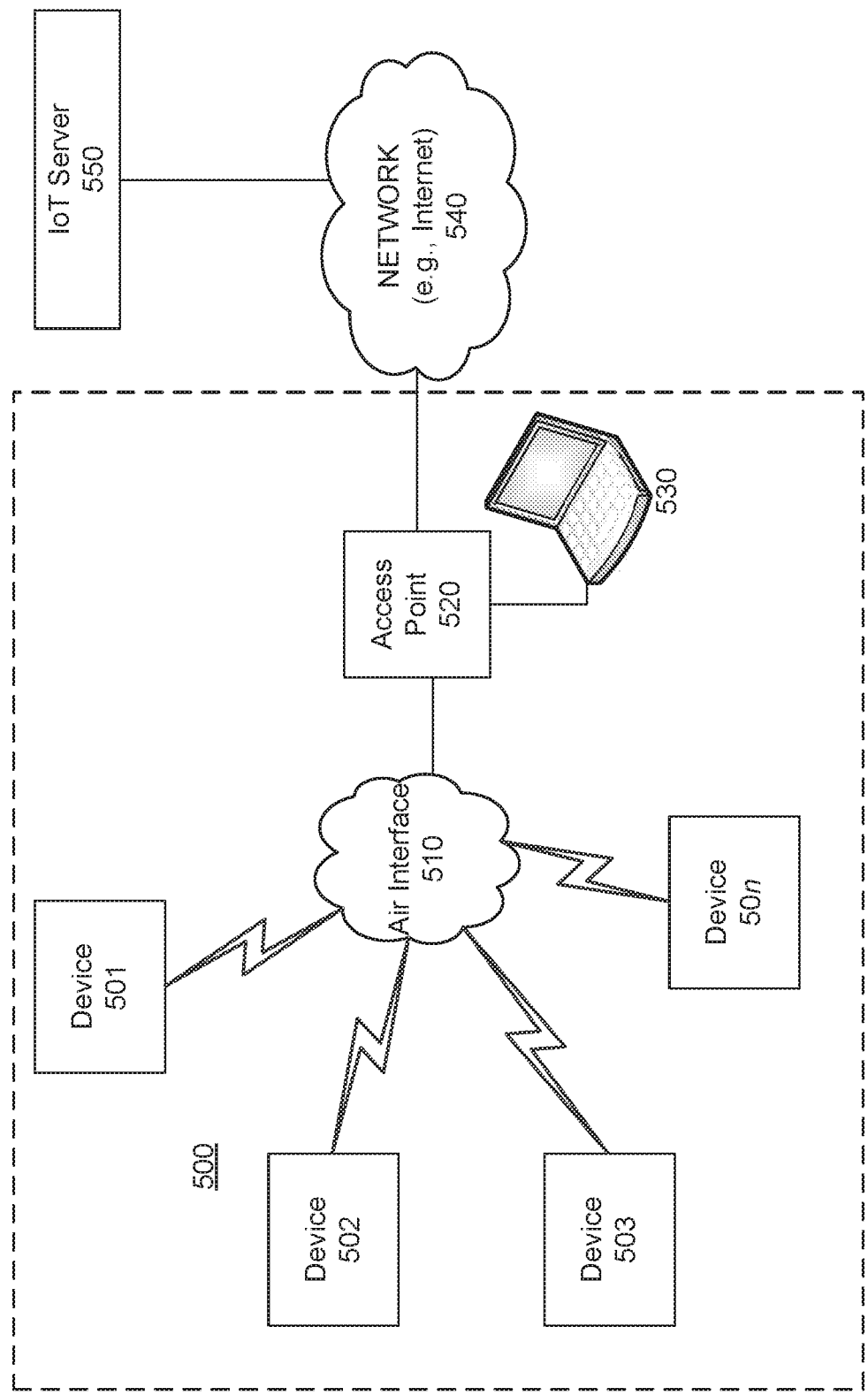
FIG. 5 illustrates a wireless communications system, in accordance with some embodiments.

FIG. 5 illustrates a wireless communications system, in accordance with some embodiments. In this example embodiment, a system 500 is shown to include a plurality of devices 501-50n communicatively coupled to an Internet of Things (IOT) server 550 via a network 540 (e.g., a local ad-hoc network, the Internet, and so forth). IOT communications describe communications involving any transceiver device (e.g., a sensor, a machine, and so forth) that has an addressable wired or wireless interface (e.g., an Internet protocol (IP) address, a Bluetooth identifier, an NFC identifier, and so forth) and can transmit information to one or more other devices via an air interface 510. Each of the devices 501-50n can have an active communication interface, such as transceiver circuitry, or a passive communication interface, such as a quick response (QR) code, a RF identifier (RFID) tag, an NFC tag, and so forth.

Accordingly, the system 500 can be comprised of a combination of mobile computing devices 104, 150 (e.g., laptop or desktop computers, smartphones, wearable mobile computing devices 102, and so forth) in addition to devices that do not typically have Internet-connectivity (e.g., individual sensors placed in movable objects, reduced mobility devices such as household appliances, and so forth). Each of the devices 501-50n device can communicate via the network 540. Communication between devices that do not typically have Internet-connectivity can be referred to as machine-to machine (M2M) communications, wherein interactions between machines can be controlled via a mobile computing device 530 (e.g., for intra-system communications) and/or an IOT server 550 (e.g., for inter-system communications).

The devices 501-50n can be communicatively coupled to an air interface 510 comprising any wireless communication protocol. In order to increase the transmission/reception range of the devices 501-50n, in communicating with the mobile computing device 530, an access point 520 can be used. To ensure the IoT system 500 includes only devices within an expected proximity, any combination of the devices 501-50n, the access point 520, and the mobile computing device 530 can utilize any of the RSSI-based authentication processes discussed above.

Figure 6:
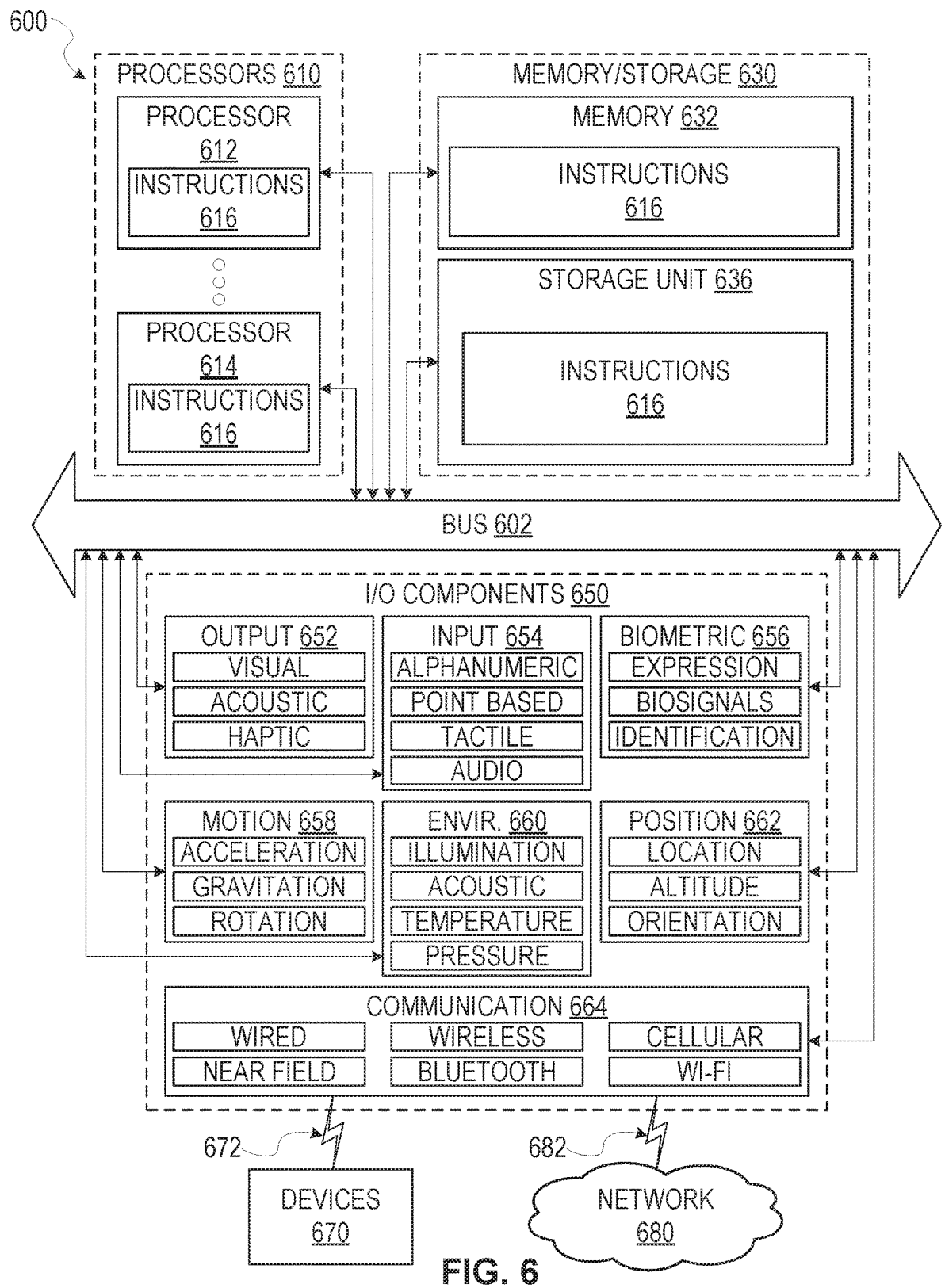
FIG. 6 is a block diagram illustrating components of a machine, according to some example embodiments, able to read instructions from a machine-readable medium and perform any one or more of the methodologies discussed herein, in accordance with some embodiments.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically. FIG. 6 shows a diagrammatic representation of the machine 600 in the example form of a computer system, within which instructions 616 (e.g., software, a program, an application 450, an applet, an app, or other executable code) for causing the machine 600 to perform any one or more of the methodologies discussed herein may be executed. For example the instructions 616 may cause the machine 600 to execute any portion(s) of the flow diagram of FIG. 5. The instructions 616 transform the general, non-programmed machine 600 into a particular machine programmed to carry out the described and illustrated functions in the manner described. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 612 and processor 614 that may execute instructions 616. The term "processor" is intended to include a multi-core processor that may comprise two or more independent processors (sometimes referred to as "cores") that may execute instructions 616 contemporaneously. Although FIG. 6 shows multiple processors, the machine 600 may include a single processor with a single core, a single processor with multiple cores (e.g., a multi-core process), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the transceiver signal processing methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of processors 610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672 respectively. For example, the communication components 664 may include a network interface component or other suitable device to interface with the network 680, and may further include any of the multiple transceiver unit devices described above. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as, location via Internet Protocol (IP) geo-location, location via. Wi-Fi® signal triangulation, location via detecting a NFC beacon signal that may indicate a particular location, and so forth.

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to devices 670. The term "transmission medium" shall be taken to include any intangible medium that is capable of storing, encoding, or carrying instructions 616 for execution by the machine 600, and includes digital or analog communications signals or other intangible medium to facilitate communication of such software.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a, limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 67 C.F.R. .sctn.1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

In Example 1, a first computing device includes one or more antennas to receive a signal from a proximate second computing device during a wireless personal area network (WPAN) connection process, the received signal to comprise a device connection request signal.

and a wireless connection controller to determine a received signal strength indicator (RSSI) value for the received signal, compare the RSSI value for the received signal with a threshold value, and based on the comparison complete the WPAN connection process with the proximate second computing device.

In Example 2, the first computing device of Example 1 optionally further includes that the wireless connection controller is to terminate the WPAN connection process with the proximate second computing device when the RSSI value for the received signal is below a threshold value.

In Example 3, the first computing device of any one or more of Examples 1 and 2 optionally further includes that the wireless connection controller is to further execute an authentication and key agreement (AKA) authentication process, and the one or more antennas are to further transmit data, to the proximate second computing device subsequent to the execution of the AKA authentication process.

In Example 4, the first computing device of any one or more of Examples 1-3 optionally further includes that the wireless connection controller comprises a Bluetooth Low Energy (BTLE) controller, and the WPAN connection process comprises operations to execute a communications stack associated with the WPAN, exchange paring request/response signals with the proximate second computing device, execute a security management protocol (SMP), establish an encrypted connection to perform one or more key distribution operations, and exchange data over the encrypted connection.

In Example 5, the first computing device of any one or more of Examples 1-4 optionally further includes that the wireless connection controller is to further determine whether the proximate second computing device has previously attempted to execute the WPAN connection process in excess of a threshold value of attempts and terminate the WPAN connection process with the proximate second computing device when the proximate second computing device has previously attempted to execute the WPAN connection process in excess of the threshold value of attempts.

In Example 6, the first computing device of any one or more of Examples 1-5 optionally further includes that the first computing device comprises a wearable computing device further comprising, one or more biometric sensors for contacting a body part of a user to obtain biometric data of the user when the wearable computing device is worn by the user, and a wearable housing to at least partially enclose the one or more antennas, the wireless connection controller, and the one or more biometric sensors.

In Example 7, the first computing device of any one or more of Examples 1-6 optionally further includes that the wearable housing comprises a flexible continuous band for wearing on a wrist of a user.

In Example 8, the first computing device of any one or more of Examples 1-7 optionally further includes a display to display data indicating the proximate second computing device is not within a proximate distance range when the RSSI value for the received signal is below the threshold value.

In Example 9, an apparatus includes one or more memory devices, one or more processors communicatively coupled to the one or more memory devices, a device connection module, executable via the one or more processors using instructions stored by the one or more memory devices, to execute a wireless personal area network (WPAN) connection process, including operations to receive a signal from a peripheral device during WPAN connection process, the received signal to comprise at least one of a peripheral device advertising broadcast signal or a peripheral device pairing response signal, determine a received signal strength indicator (RSSI) value for the received signal, and based on the comparison complete the WPAN connection process with the peripheral device.

In Example 10, the apparatus of Example 9 optionally further includes that the WPAN connection process further includes operations to terminate the WPAN connection process with the peripheral device when the RSSI value for the received signal is below a threshold value.

In Example 11, the apparatus of any one or more of Examples 9 and 10 optionally further includes that the device connection module is to complete the WPAN connection process by executing an authentication and key agreement (AKA) authentication process and the device connection module is to further receive data, from the peripheral device subsequent to the execution of the AKA authentication process.

In Example 12, the apparatus of any one or more of Examples 9-11 optionally further includes that the peripheral device comprises a Bluetooth Low Energy (BTLE) device, and the threshold value is based, at least in part, on an expected proximity of the BTLE device and the apparatus.

In Example 13, the apparatus of any one or more of Examples 9-12 optionally further includes that the peripheral device comprises an Internet of Things (IoT) device, and the threshold value is based, at least in part, on an expected proximity of the IoT device and the apparatus.

In Example 14, the apparatus of any one or more of Examples 9-13 optionally further includes that the device connection module is to further determine whether the peripheral device has previously attempted to execute the WPAN connection process in excess of a threshold value of attempts and terminate the WPAN connection process with the peripheral device when the peripheral device has previously attempted to execute the WPAN connection process in excess of the threshold value of attempts.

In Example 15, the apparatus of any one or more of Examples 9-14 optionally further includes that the device connection module is configured to execute the WPAN connection process for a plurality of peripheral devices to be communicatively coupled to the apparatus at the same time.

In Example 16, the apparatus of any one or more of Examples 9-15 optionally further includes a display to display data indicating the peripheral device is not within a proximate distance range when the RSSI value for the received signal is below the threshold value.

In Example 17, a non-transitory computer-readable medium includes contents that, when executed by a first device, cause the first to perform operations to receive a signal from a second device during a wireless personal area network (WPAN) connection process, determine a received signal strength indicator (RSSI) value for the received signal, and based on the RSSI value for the received signal complete the WPAN connection process with the second device.

In Example 18, the non-transitory computer-readable medium of Example 17 optionally further includes that the operations further comprise operations to terminate the WPAN connection process with the second device when the RSSI value for the received signal is below a threshold value.

In Example 19, the non-transitory computer-readable medium of any one or more of Examples 17 and 18 optionally further includes that the first device comprises a mobile computing device and the second device comprises a peripheral device.

In Example 20, the non-transitory computer-readable medium of any one or more of Examples 17-19 optionally further includes that the received signal comprises at least one of a peripheral device advertising broadcast signal or a peripheral device pairing response signal.

In Example 21, the non-transitory computer-readable medium of any one or more of Examples 17-20 optionally further includes that the first device comprises a peripheral device and the second device comprises a mobile computing device.

In Example 22, the Non-Transitory Computer-Readable Medium of any one or more of Examples 17-21 optionally further includes that the received signal comprises a device connection request signal.

In Example 23, the non-transitory computer-readable medium of any one or more of Examples 17-22 optionally further includes that the operation to complete the WPAN connection process comprises an operation to execute an authentication and key agreement (AKA) authentication process, and the mobile computing device to further perform operations to transmit or receive data to or from the second device subsequent to the execution of the AKA authentication process.

In Example 24, the non-transitory computer-readable medium of any one or more of Examples 17-23 optionally further includes that at least one of the first device or the second device comprises a Bluetooth Low Energy (BTLE) device.

In Example 25, the non-transitory computer-readable medium of any one or more of Examples 17-24 optionally further includes that at least one of the first device or the second device comprises an Internet of Things (IoT) device.

What is claimed:

1. A first computing device comprising:
   one or more antennas to receive a signal from a proximate second computing device during a wireless personal area network (WPAN) connection process, the received signal to comprise a device connection request signal; and
   a wireless connection controller to:
   determine a received signal strength indicator (RSSI) value for the received signal;
   compare the RSSI value for the received signal with a threshold value; and
   based on the comparison, complete the WPAN connection process with the proximate second computing device.

2. The first computing device of claim 1, wherein the wireless connection controller is to:
   terminate the WPAN connection process with the proximate second computing device when the RSSI value for the received signal is below a threshold value.

3. The first computing device of claim 1, wherein the wireless connection controller is to further execute an authentication and key agreement (AKA) authentication process, and the one or more antennas are to further transmit data to the proximate second computing device subsequent to the execution of the AKA authentication process.

4. The first computing device of claim 1, wherein the wireless connection controller comprises a Bluetooth Low Energy (BTLE) controller, and the WPAN connection process comprises operations to:
   execute a communications stack associated with the WPAN;
   exchange paring request/response signals with the proximate second computing device;
   execute a security management protocol (SMP);
   establish an encrypted connection to perform one or more key distribution operations; and
   exchange data over the encrypted connection.

5. The first computing device of claim 1, wherein the first computing device comprises a wearable computing device further comprising:
   one or more biometric sensors for contacting a body part of a user to obtain biometric data of the user when the wearable computing device is worn by the user; and
   a wearable housing to at least partially enclose the one or more antennas, the wireless connection controller, and the one or more biometric sensors.

6. The first computing device of claim 5, wherein the wearable housing comprises a flexible continuous band for wearing on a wrist of a user.

7. The first computing device of claim 1, further comprising:
   a display to display data indicating the proximate second computing device is not within a proximate distance range when the RSSI value for the received signal is below the threshold value.

8. An apparatus comprising:
one or more memory devices;
one or more processors communicatively coupled to the one or more memory devices;
a device connection module, executable via the one or more processors using instructions stored by the one or more memory devices, to execute a wireless personal area network (WPAN) connection process, including operations to:
receive a signal from a peripheral device during WPAN connection process, the received signal to comprise at least one of a peripheral device advertising broadcast signal or a peripheral device pairing response signal;
determine a received signal strength indicator (RSSI) value for the received signal; and
based on the comparison, complete the WPAN connection process with the peripheral device.

9. The apparatus of claim 8, wherein the WPAN connection process further includes operations to:
terminate the WPAN connection process with the peripheral device when the RSSI value for the received signal is below a threshold value.

10. The apparatus of claim 8, wherein the device connection module is to complete the WPAN connection process by executing an authentication and key agreement (AKA) authentication process and the device connection module is to further:
receive data from the peripheral device subsequent to the execution of the AKA authentication process.

11. The apparatus of claim 8, wherein the peripheral device comprises a Bluetooth Low Energy (BTLE) device, and the threshold value is based, at least in part, on an expected proximity of the BTLE device and the apparatus.

12. The apparatus of claim 8, wherein the peripheral device comprises an Internet of Things (IoT) device, and the threshold value is based, at least in part, on an expected proximity of the IoT device and the apparatus.

13. The apparatus of claim 8, wherein the device connection module is configured to execute the WPAN connection process for a plurality of peripheral devices to be communicatively coupled to the apparatus at the same time.

14. The apparatus of claim 8, further comprising:
a display to display data indicating the peripheral device is not within a proximate distance range when the RSSI value for the received signal is below the threshold value.

15. A non-transitory computer-readable storage medium comprising contents that, when executed by a first device, cause the first to perform operations to:
receive a signal from a second device during a wireless personal area network (WPAN) connection process;
determine a received signal strength indicator (RSSI) value for the received signal; and
based on the RSSI value for the received signal complete the WPAN connection process with the second device.

16. The non-transitory computer-readable storage medium 15, wherein the operations further comprise operations to:
terminate the WPAN connection process with the second device when the RSSI value for the received signal is below a threshold value.

17. The non-transitory computer-readable storage medium of claim 15, wherein the first device comprises a mobile computing device and the second device comprises a peripheral device.

18. The non-transitory computer-readable storage medium of claim 17, wherein the received signal comprises at least one of a peripheral device advertising broadcast signal or a peripheral device pairing response signal.

19. The non-transitory computer-readable storage medium of claim 15, wherein the first device comprises a peripheral device and the second device comprises a mobile computing device.

20. The non-transitory computer-readable storage medium of claim 19, wherein the received signal comprises a device connection request signal.

21. The non-transitory computer-readable storage medium of claim 15, wherein the operation to complete the WPAN connection process comprises an operation to execute an authentication and key agreement (AKA) authentication process, and the mobile computing device to further perform operations to:
transmit or receive data to or from the second device subsequent to the execution of the AKA authentication process.

22. The non-transitory computer-readable storage medium of claim 15, wherein at least one of the first device or the second device comprises a Bluetooth Low Energy (BTLE) device.

23. The non-transitory computer-readable storage medium of claim 15, wherein at least one of the first device or the second device comprises an Internet of Things (IoT) device.

* * * * *

UNITED STATES PATENT AND TRADEMARK OFFICE
CERTIFICATE OF CORRECTION

PATENT NO. : 10,728,931 B2
APPLICATION NO. : 16/048657
DATED : July 28, 2020
INVENTOR(S) : Hamid Alipour et al.

Page 1 of 1

It is certified that error appears in the above-identified patent and that said Letters Patent is hereby corrected as shown below:

In the Specification

Column 11, Line 47, Delete "signal." and insert -- signal --.
Column 11, Line 48-53, Delete "and a wireless connection controller to determine a received signal strength indicator (RSSI) value for the received signal, compare the RSSI value for the received signal with a threshold value, and based on the comparison complete the WPAN connection process with the proximate second computing device." and insert the same on Column 11, Line 47 as a continuation of the same paragraph.

In the Claims

Column 16, Line 10, In Claim 16, after "medium" insert -- of claim --.

Signed and Sealed this
Twenty-sixth Day of December, 2023

Katherine Kelly Vidal
*Director of the United States Patent and Trademark Office*